Aug. 6, 1929. W. L. HAWKINS 1,723,616
BRUSH RAKE
Filed Jan. 21, 1927
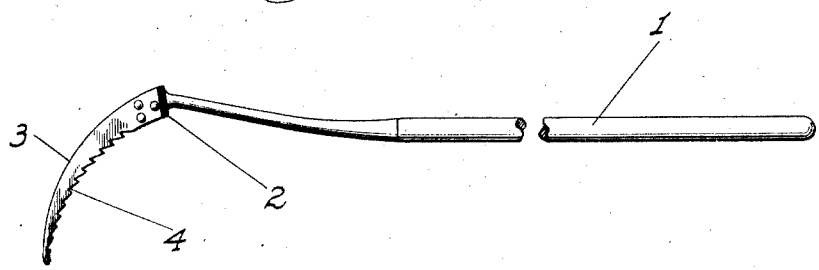
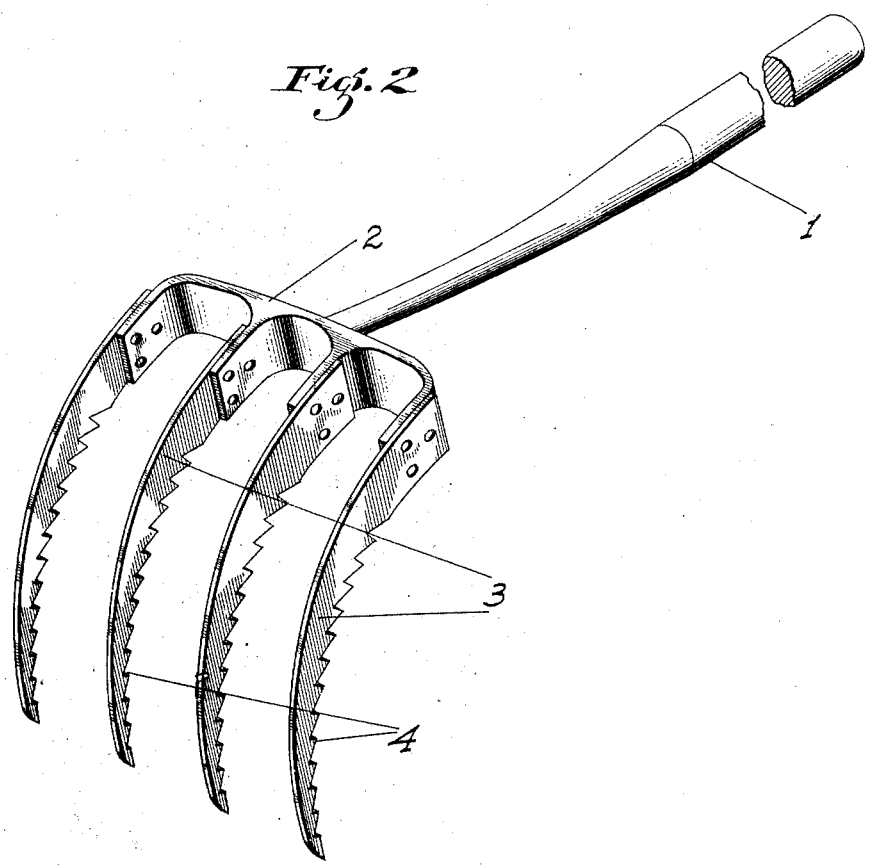
INVENTOR.
W. L. Hawkins.
BY
ATTORNEY Patented Aug. 6, 1929.

1,723,616

UNITED STATES PATENT OFFICE.

WILLIAM L. HAWKINS, OF OAKDALE, CALIFORNIA.

BRUSH RAKE.

Application filed January 21, 1927. Serial No. 162,501.

This invention relates to improvements in rakes, particularly of that type used in gathering up brush such as prunings from trees, bushes, vines and the like, and also heavy weedy material generally.

The difficulty in handling this material in the past with the ordinary rakes has been that due to the springiness of the brush, and also the usual tangled and loose condition, the ordinary rake instead of engaging and moving the same simply slips off or rides over the pile so that the handling of the brush or like material with the ordinary rake is very hard, cumbersome and inefficient.

It is therefore the object of the present invention to provide the rake tines in such relative position with respect to the handle and of such a length and so peculiarly constructed as to engage the body, twigs and projections of the brush and cling to the same during the raking operations, but which can be readily disassociated therefrom at will as the brush is moved into the desired piles.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side elevation of the rake with the handle broken out.

Fig. 2 is a perspective view of the same, showing in detail the relative arrangement and construction of the rake tines.

Referring now more particularly to the characters of reference on the drawings, the numeral 1 designates the handle and 2 the cross-head on the handle. Secured to the cross head 2 and projecting therefrom are any arbitrarily selected number of rake tines 3. These rake tines may be straight but are preferably curved as shown in a general direction at an obtuse angle of about 135 degrees to the handle 1, and taper towards their lower ends. The tines 3 on my improved rake are relatively longer than the tines on the average rake now in common use, and on the inner or concave edge of each tine is provided a row of teeth or serrations 4, which teeth or serrations are preferably of ratchet form and face toward the handle, with their upper edges substantially parallel to the line of movement of the rake when in use. The teeth being distributed throughout the length of the tines, all the load is not taken by any one tooth, but all the teeth engage a certain amount of the material being raked up, and prevent it from bunching up at the outer ends of the tines.

In using my improved rake the tines are moved into engagement with the brush or cuttings and the teeth or serrations 4 engage and cling to the bodies of the brush and to the twigs and projections thereon, and owing to the particular formation and setting of the teeth, they act to securely hold the brush against the tines, so that the brush is forced to move positively under the action of the rake instead of the tines slipping over the same, as is the common trouble in connection with rakes now in use. After the brush has been raked to the desired pile the teeth or serrations 4 are readily disengaged from engagement with the brush by moving the rake in the reverse direction, which will free the teeth and the tines from the brush, as will be obvious.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A brush rake comprising a handle, a crosshead on the lower end thereof, tines depending from the crosshead, said tines being disposed so that lines drawn from the points of the tines to the crosshead include an angle with the handle greater than 90° and being convexly curved relative to said lines; and ratchet teeth facing toward the handle provided on the under faces of the tines throughout their length.

In testimony whereof I affix my signature.

WILLIAM L. HAWKINS.